Sept. 20, 1971      J. A. MILLER      3,606,054
METHOD FOR STABILIZING A PLURALITY OF ABUTTING
RECTILINEAR SURFACES
Filed April 15, 1969      2 Sheets-Sheet 1

INVENTOR
JAMES A. MILLER

BY *Semmes and Semmes*

ATTORNEYS

INVENTOR
JAMES A. MILLER

BY *Semmes and Semmes*

ATTORNEYS

United States Patent Office 3,606,054
Patented Sept. 20, 1971

3,606,054
METHOD FOR STABILIZING A PLURALITY OF ABUTTING RECTILINEAR SURFACES
James A. Miller, Rte. 1, Box 225, Tiffin, Ohio
Filed Apr. 15, 1969, Ser. No. 816,205
Int. Cl. B65g 1/14
U.S. Cl. 214—152                    2 Claims

ABSTRACT OF THE DISCLOSURE

Method for stabilizing a plurality of abutting rectilinear surfaces, so as to hold the surfaces in longitudinal and lateral alignment in a desired support plane, particularly a method for so stabilizing a plurality of squared spool ends. The method includes notching opposed portions of the abutting surfaces so as to define a cylindrical aperture, then securing the surface against lateral movement by imposing a cylindrical force within the aperture and securing the surfaces against longitudinal movement by applying opposed lateral forces radially outwardly of said aperture on both sides of said abutting surfaces.

BACKGROUND OF THE INVENTION

(1) Field of the invention

Sheet fabric and sheet plastic, such as is trademarked cellophane, Plyafilm, and Koraseal, are shipped conventionally on spools or mandrels supported in square end boards. A principal problem has been in stacking the spool end boards side-by-side and vertically one upon the other, while maintaining the end boards in lateral and longitudinal alignment. The end boards are made of hardboard or other material having thicknesses varying from ½ to 3 inches with a hole cut in the center of the board for attachment of the center pole or mandrel around which the material is wrapped. When several rolls are so stacked and shipped on a skid the end boards are inclined to slip out of longitudinal or lateral alignment, with the sharp cornered end board engaging and cutting into the adjacent fabric or plastic sheet material. The only effective albeit expensive, alternative has been to package each individual spool separately.

(2) Description of the prior art

Prior art has not directed itself specifically to the problem of stabilizing a stack of squared spool ends, but has addressed itself to stabilizers or indexing means which fit within complementary recesses in opposed crates or packages. Prior art searching has developed:

Lagasse, 1,782,307
Chandonia, 2,198,106
Haack, 2,358,160
Pizzi, 2,998,940
Miller, 3,216,538

Lagasse is typical of the prior art concept of fitting stabilizers or indexing means within complementary recesses in opposed crates or packages. However, none of these prior inventors have approached applicant's technique of providing both lateral and longitudinal stability in the abutting surfaces. Chandonia stabilizes baking pans by means of his triangular clips. Haack stabilizes beehives by means of a vertical dowel pin. Pizzi shows a reel-supporting pallet and Miller shows a bracket for securing metal awning panels.

SUMMARY OF THE INVENTION

According to the present invention, a plurality of horizontally and vertically stacked spool ends are stabilized both laterally and longitudinally, so as to maintain the spool ends within a limited vertical plane. Within the abutting surfaces of the spool ends complementary notches are cut so as to define a cylindrical aperture. The abutting surfaces adjacent the aperture are secured against lateral movement by imposing a cylindrical force in said aperture and they are secured against longitudinal movement by applying opposed lateral forces radially outwardly of said aperture on the inside and outside of the abutting surfaces. A suggested stacking stabilizer include a cylindrical core having peripherally extending flanges at either end so as to define an annular recess about the core. The core is inserted within the cylindrical notch defined in the opposed abutting surfaces and the peripherally extending flanges abut the front and rear of the abutting surfaces radially outwardly of the aperture, so as to support the spool ends in longitudinal alignment. Modifications of invention consist in various modes of notching the opposed abutting surfaces.

BRIEF DESCRIPTION OF THE DRAWINGS

Figure 1:
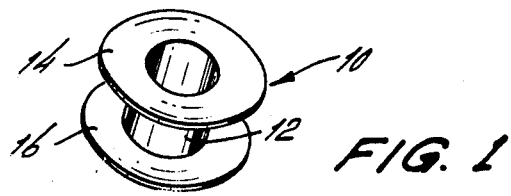
FIG. 1 is a perspective view of a proposed stacking stabilizer construction.

In FIG. 1, a proposed stacking stabilizer is illustrated as comprising a cylindrical core 12 having peripherally extending flanges 14 and 16 at either end of the core. Flanges 14 and 16 define an intervening annular recess. Dimensions of core length, diameter, and the peripheral flanges, of course, may be varied to suit a variety of end board materials.

Figure 2:
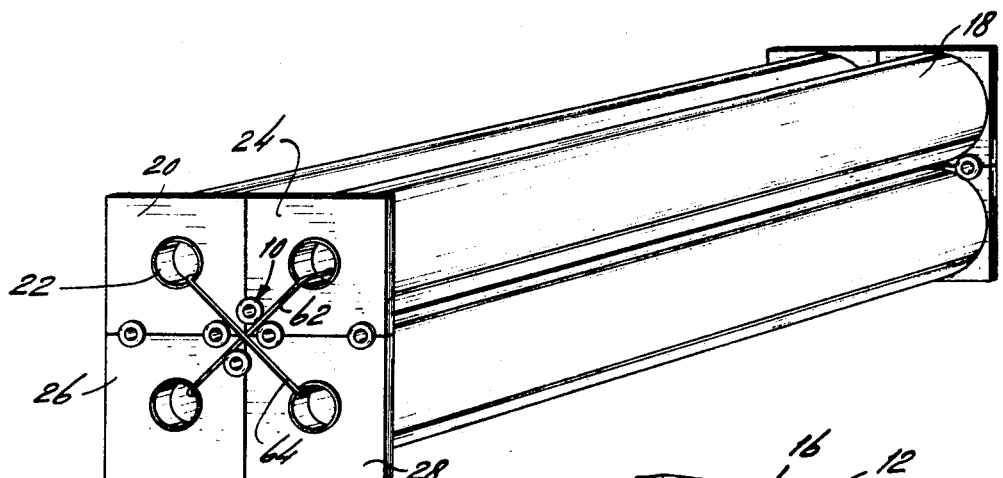
FIG. 2 is a perspective view of four rolls of film material having their end boards stabilized laterally and longitudinally, according to the present method.
Figure 4:
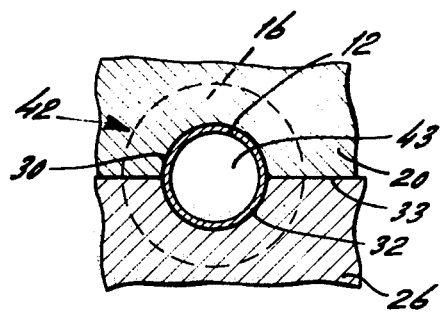
FIG. 4 is fragmentary enlarged vertical section of the FIG. 1 lateral stabilizer positioned within a cylindrical aperture defined in abutting surfaces of the end boards in FIG. 2.
Figure 3:
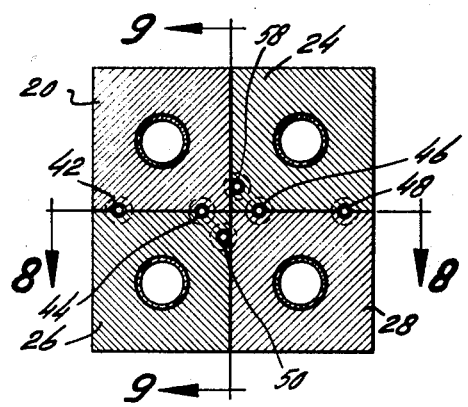
FIG. 3 is a vertical sectional view of the four end boards stacked in FIG. 2.

In FIG. 2, stacking stabilizers of the type illustrated in FIG. 1 are shown positioned in the abutting rectilinear surfaces of the spool end boards. In FIGS. 2 and 3, four spools 18 positioned in end boards 20, 24, 26, and 28 are shown as laterally and longitudinally aligned by the use of the six stacking stabilizers 42, 44, 46, 48, 50, and 58. As illustrated in FIG. 4, stacking stabilizer 42 is shown positioned in complementary notches 30 and 32 defined in the opposed abutting surfaces of end boards 20 and 26, so as to define a cylindrical aperture 43. The stabilizer core 12 is thrust longitudinally through the aperture and the stabilizer peripheral flanges 16 and 14 abut, respectively, the inside and the outside of the end board 20 and 26 surfaces. Lateral slipping of end boards 20 and 26 is prevented by the core extending through the opposed abutting surface line 33 and longitudinal slipping is prevented by the flanges 16 and 14 abutting the inside and outside of the end board.

Figure 5:
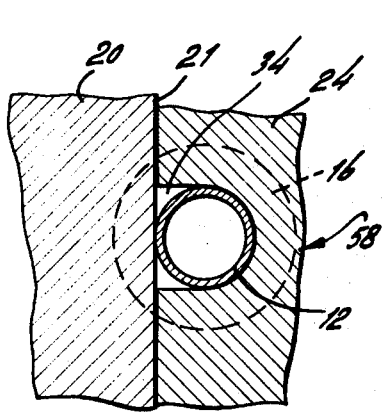
FIG. 5 is a like vertical section showing a modification of invention, wherein the abutting surfaces are aligned against longitudinal displacement by positioning a stabilizer in a notch defined in only one of the abutting surfaces.

In FIG. 5, stacking stabilizer 58 is shown positioned so as to stabilize the vertically abutting surfaces of end boards 20 and 24 along the abutting line 21. A laterally elongated U-shaped notch 34 is defined in the end wall 24 to the extent that the core 12 rests in a cylindrical seat defined entirely within end board 24, while the peripheral flanges 14 and 16 respectively overlie the outside and inside of the end wall.

Figure 6:
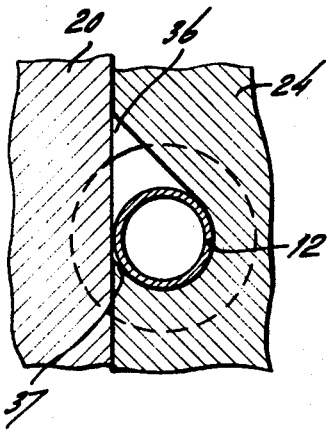
FIG. 6 is a fragmentary enlarged vertical section of a further modification of invention, wherein the stacking stabilizer is positioned in an inclined notch defined in one of two vertically abutting surfaces, the inclined notch preventing the stabilizer from slipping out, as the abutting surfaces are parted.

In FIG. 6, this concept of stabilizing vertically abutting surfaces is further carried out wherein an inclined notch 36 is formed in end board 24. The inclined notch shoulder 37 prevents the core 12 from slipping out and falling, as the end boards are separated. In normal practice the end boards are separated one by one hence the necessity for a vertical retainer means such as shoulder 37.

Figure 7:
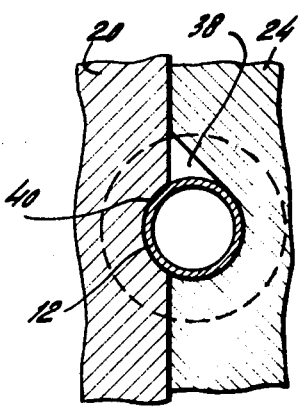
FIG. 7 is a fragmentary enlarged vertical section of a further modification wherein the inclined notch with a partially cylindrical base is defined in one of the opposed vertical sections and a complementary partially cylindrical notch is defined in the abutting surface.

In FIG. 7, a further modification is illustrated wherein increased stability is obtained by having an inclined notch 38 with a partially cylindrical base defined in end board 24 and a complementary notch 40 defined as a partial cylinder in end board 20, so that the core 12 rests both within end board 20 and end board 24.

Figure 8:
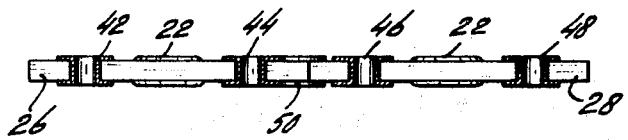
FIG. 8 is a transverse section taken along section line 8—8 of FIG. 3.
Figure 10:
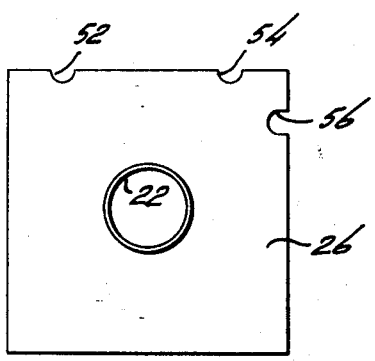
FIG. 10 is a front elevation of a proposed spool end board, having an axial aperture for the mandrel or spool and stabilizer notches defined in two of its four surfaces.

In the FIG. 8 transverse sectional view, stacking stabilizers 42, 44, 46, 48, and the lower stabilizer 50 are shown positioned in end boards 26 and 28 each having an axial aperture 22 for receipt of the spool mandrel.

Figure 9:
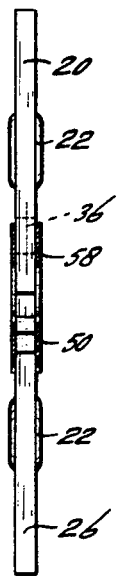
FIG. 9 is a vertical section taken along section line 9—9 of FIG. 3.

In FIG. 9, vertical stabilizers 58 and 50 are illustrated as engaging end boards 20 and 26.

As shown in FIG. 1, an optional securement consists in the use of elastic lines 62 and 64 which may be inserted through the aperture 22 and through the mandrels (not illustrated).

Manifestly, the proposed method provides both longitudinal and lateral stability while permitting the end boards or spool ends to be removed quickly and separately. The stabilizers are positioned easily by inserting them first in one notch and moving the other spool end board into abutment, so as to achieve a positive "lock." The present method eliminates the necessity for further securement by ordinary straps of steel or other tie lines. The stabilizer may be made from two steel stamps welded together. However, the stabilizer may be plastic-molded. The dimensions of the spool and notches may be varied without departing from the spirit of invention.

I claim:
1. Method for stabilizing two articles having rectilinear surfaces abutting in a vertical plane, comprising:
   (A) notching one of said articles, so as to form an aperture in said surface, said notch extending downwardly and inclinedly away from its abutting surface in said vertical plane, so as to define a partially cylindrical seat at the bottom of said notch with the lowest point of said seat being below the lowest point of the aperture in said surface;
   (B) imposing a cylindrical force within said notch; and
   (C) securing said surfaces against movement out of said vertical plane by applying opposed lateral forces radially outwardly at said aperture on both sides of said abutting surfaces and both sides of said vertical planes.

2. Method for stabilizing two articles having rectilinear surfaces abutting in a vertical plane, comprising:
   (A) notching opposed portions of said articles along said vertical plane, so as to define a cylindrical aperture extending across said vertical plane into both surfaces, said notching in one article being partially cylindrical and said notching in said other article being downwardly inclined with a partially cylindrical seat at its base complementary intersecting said partially cylindrical seat in said one article, the lowest point of said partially cylindrical seat being below the lowest point of notching in said other article;
   (B) securing said surfaces against lateral movement by imposing a cylindrical force within said aperture; and
   (C) securing said surfaces' longitudinal movement out of said vertical plane by applying opposed lateral forces radially outwardly of said aperture on both sides of said abutting surfaces and said vertical plane.

References Cited
UNITED STATES PATENTS

| | | | |
|---|---|---|---|
| 1,881,822 | 10/1932 | McKelligon | 220—7 |
| 3,384,228 | 5/1968 | Cannon | 206—65 |

FOREIGN PATENTS

| | | | |
|---|---|---|---|
| 131,565 | 2/1949 | Australia | 52—586 |

GERALD M. FORLENZA, Primary Examiner

F. E. WERNER, Assistant Examiner

U.S. Cl. X.R.

206—65R; 214—10.5R; 220—97B